(12) United States Patent
Lee et al.

(10) Patent No.: US 12,371,597 B2
(45) Date of Patent: Jul. 29, 2025

(54) PREPARATION METHOD OF ACRYLATE-BASED PRESSURE-SENSITIVE ADHESIVE COMPOSITION

(71) Applicant: LG Chem, Ltd., Seoul (KR)

(72) Inventors: Kumhyoung Lee, Daejeon (KR); Seung Hun Yang, Daejeon (KR); Hye Soo Han, Daejeon (KR)

(73) Assignee: LG Chem, Ltd., Seoul (KR)

(*) Notice: Subject to any disclaimer, the term of this patent is extended or adjusted under 35 U.S.C. 154(b) by 806 days.

(21) Appl. No.: 17/637,284

(22) PCT Filed: Sep. 9, 2020

(86) PCT No.: PCT/KR2020/012133
§ 371 (c)(1),
(2) Date: Feb. 22, 2022

(87) PCT Pub. No.: WO2021/049856
PCT Pub. Date: Mar. 18, 2021

(65) Prior Publication Data
US 2022/0282128 A1    Sep. 8, 2022

(30) Foreign Application Priority Data

Sep. 10, 2019  (KR) .......... 10-2019-0112399
Sep. 8, 2020   (KR) .......... 10-2020-0114810

(51) Int. Cl.
*C09J 133/10*  (2006.01)
*C09J 7/38*    (2018.01)
(Continued)

(52) U.S. Cl.
CPC .......... *C09J 133/10* (2013.01); *C09J 7/385* (2018.01); *C09J 11/04* (2013.01); *C09J 11/06* (2013.01);
(Continued)

(58) Field of Classification Search
CPC ... C09J 7/385; C09J 11/04; C09J 11/06; C09J 133/10; C09J 2301/408; C09J 133/066
See application file for complete search history.

(56) References Cited

U.S. PATENT DOCUMENTS 6,147,165 A     11/2000  Lee et al.
2004/0192831 A1  9/2004  Chen et al.
2015/0024199 A1  1/2015  Morimoto et al.

FOREIGN PATENT DOCUMENTS

CN     1791651 A    6/2006
CN   107779133 A    3/2018
(Continued)

OTHER PUBLICATIONS

JP2011219614 (A), Kegeishi Kazuji et al., Acrylic emulsion and method for producing the same, English translation, 24 pages (Year: 2011).*

(Continued)

*Primary Examiner* — Yate' K Cutliff
(74) *Attorney, Agent, or Firm* — Lerner David LLP (57) ABSTRACT

The present disclosure relates to a preparation method of an acrylate-based pressure-sensitive adhesive composition. According to the present disclosure, it is possible to provide a preparation method of an acrylate-based pressure-sensitive adhesive composition which exhibits high ball tack while suppressing the generation of bubbles due to its excellent antifoaming ability.

9 Claims, 1 Drawing Sheet

(51) Int. Cl.
*C09J 11/04* (2006.01)
*C09J 11/06* (2006.01)
*C09J 133/06* (2006.01)

(52) U.S. Cl.
CPC ..... *C09J 133/066* (2013.01); *C09J 2203/334* (2013.01); *C09J 2301/408* (2020.08)

(56) References Cited

FOREIGN PATENT DOCUMENTS

| | | | | |
|---|---|---|---|---|
| JP | H09278837 | A | | 10/1997 |
| JP | 2006016516 | A | | 1/2006 |
| JP | 2007211074 | A | | 8/2007 |
| JP | 2011219614 | A | * | 11/2011 ................ C08F 2/26 |
| KR | 870001645 | B1 | | 9/1987 |
| KR | 20090093171 | A | | 9/2009 |
| KR | 101345149 | B1 | | 12/2013 |
| KR | 20160024897 | A | | 3/2016 |
| KR | 101725869 | B1 | | 4/2017 |
| KR | 101828931 | B1 | | 2/2018 |
| KR | 20180075307 | A | | 7/2018 |
| WO | 2016024729 | A1 | | 2/2016 |

OTHER PUBLICATIONS

Search Report dated Oct. 20, 2022 from the Office Action for Chinese Application No. 202080062514.3 issued Oct. 26, 2022, pp. 1-3.

International Search Report for PCTKR2020012133 dated Dec. 30, 2020, 2 pgs.

Extended European Search Report including Written Opinion for Application No. 20862450.2 dated Sep. 21, 2022, pp. 1-6.

* cited by examiner

PREPARATION METHOD OF ACRYLATE-BASED PRESSURE-SENSITIVE ADHESIVE COMPOSITION

CROSS-REFERENCE TO RELATED APPLICATION(S)

The present application is a national phase entry under 35 U.S.C. § 371 of International Application No. PCT/KR2020/012133, filed on Sep. 9, 2020, which claims priority from Korean Patent Applications No. 10-2019-0112399, filed on Sep. 10, 2019, and Korean Patent Application No. 10-2020-0114810, filed on Sep. 8, 2020, the disclosures of which are incorporated herein by reference in their entirety.

BACKGROUND OF THE INVENTION

(a) Field of the Invention

The present disclosure relates to a preparation method of an acrylate-based pressure-sensitive adhesive composition.
The present disclosure relates to a preparation method of an acrylate-based pressure-sensitive adhesive composition.

(b) Description of the Related Art

Pressure-Sensitive Adhesive (PSA) is a material that adheres to an adherend with a small pressure. It is a viscoelastic material different from adhesives, has basic properties of initial adhesion, adhesion, and cohesion, and is used in various industrial fields such as printing, chemistry, pharmaceuticals, home appliances, automobiles, and stationery.

The pressure-sensitive adhesive can be classified into acrylate-based, rubber-based, silicone-based, EVA-based pressure-sensitive adhesive, etc., depending on the monomer used in manufacturing, and can be classified into solvent-type, emulsion-type, and hot-melt-type depending on its shape.

In general, adhesive labels, called labels or label stickers, are used in almost all industrial fields such as printing, chemicals, pharmaceuticals, cosmetics, food industry, home appliances, automobiles, and stationery, as well as trademarks and advertisements on products. Generally, papers such as art paper, vellum paper, mirror-coated paper, gold and silver paper, thermal paper, kraft paper, fluorescent paper, sterile paper, and photo paper, or films such as PET, PVC, PE, PP, PS, and PI are used as the material of the adherend to which the adhesive label is attached, and they can be applied to final products after regular printing on the surface. Adhesive strength of the pressure-sensitive adhesive used in the adhesive label is determined depending on the application.

In general, main factors of adhesion, one of physical properties of the pressure-sensitive adhesive, are initial adhesion and holding power. In addition, there are various test methods such as low temperature adhesion, aging adhesion, dimensional stability, chemical resistance, and mandrel hold, depending on the product category or application.

Meanwhile, in order to manufacture the adhesive label, a process of coating the adhesive composition to a substrate is required, and for example, the adhesive label can be manufactured using a coating device such as a gravure coater. However, when a high-speed gravure coating process is used, bubbles are likely to occur in the acrylate-based pressure-sensitive adhesive composition, and when bubbles are generated, fish eyes are formed on the surface of the applied pressure-sensitive adhesive resin, resulting in poor coating quality. There is a method of adding an excessive amount of an antifoaming agent to suppress the generation of bubbles, but it may cause a decrease in adhesive properties.

In addition, an acrylate-based emulsion pressure-sensitive adhesive used for general-purpose labels is required to have high ball tack among initial adhesion properties.

SUMMARY OF THE INVENTION

Technical Problem

There is provided a preparation method of an acrylate-based pressure-sensitive adhesive composition that has excellent antifoaming ability to suppress generation of bubbles and obtain excellent coating quality.

Technical Solution

There is provided a preparation method of an acrylate-based pressure-sensitive adhesive composition including the steps of:
preparing a monomer mixture containing an alkyl (meth) acrylate-based monomer; and a monomer having a hydroxyl group or a carboxyl group;
preparing a polymerization composition by adding an emulsifier to the monomer mixture;
performing emulsion polymerization of the polymerization composition in the presence of an initiator; and
adding an antifoaming agent to the emulsion-polymerized acrylate-based pressure-sensitive adhesive composition,
wherein the monomer having a hydroxyl group or a carboxyl group is contained in an amount of 1 to 5 parts by weight based on 100 parts by weight of the monomer mixture,
the polymerization initiator is contained in an amount of 0.1 to 2 parts by weight based on 100 parts by weight of the monomer mixture, and
the antifoaming agent is added at a temperature of 30 to 50° C.

Advantageous Effects

According to the present disclosure, the composition and content of monomers for preparing an acrylate-based pressure-sensitive adhesive composition, the content of an initiator, and the addition method of an antifoaming agent are optimized.

Accordingly, it is possible to provide an acrylate-based pressure-sensitive adhesive composition exhibiting excellent ball tack by maintaining good adhesive properties while suppressing generation of bubbles due to excellent antifoaming ability even with a small amount of an antifoaming agent which is added to suppress generation of bubbles.

In addition, as there is little change over time in antifoaming ability after 7 days and coating properties are excellent, the acrylate-based pressure-sensitive adhesive composition is suitable for a high-speed coating process and can exhibit stable coating properties over time.

BRIEF DESCRIPTION OF THE DRAWINGS

The FIG. 1s a drawing illustrating a method for measuring ball tack.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "contain" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the preparation method of an acrylate-based pressure-sensitive adhesive composition according to a specific embodiment of the present disclosure will be described.

The present inventors have optimized the composition and content of monomers for preparing an acrylate-based pressure-sensitive adhesive composition and the content of an initiator, and adjusted the adding conditions of an antifoaming agent added for suppressing bubbles. This led to the present invention, focusing on the fact that the effect of the antifoaming agent is sufficiently expressed, antifoaming ability is less deteriorated over time and stable coating properties may be exhibited.

Specifically, the preparation method of an acrylate-based pressure-sensitive adhesive composition of the present disclosure is characterized in that it includes the steps of preparing a monomer mixture containing an alkyl (meth)acrylate-based monomer; and a monomer having a hydroxyl group or a carboxyl group; preparing a polymerization composition by adding an emulsifier to the monomer mixture; and performing emulsion polymerization of the polymerization composition in the presence of an initiator, wherein the monomer having a hydroxyl group or a carboxyl group is contained in an amount of 1 to 5 parts by weight based on 100 parts by weight of the monomer mixture, the polymerization initiator is contained in an amount of 0.1 to 2 parts by weight based on 100 parts by weight of the monomer mixture, and the antifoaming agent is added at a temperature of 30 to 50° C.

First, in the preparation method of an acrylate-based pressure-sensitive adhesive composition according to an embodiment of the present disclosure, the monomer composition includes an alkyl (meth)acrylate-based monomer; and a monomer having a hydroxyl group or a carboxyl group, and the monomer having a hydroxyl group or a carboxyl group is contained in an amount of 1 to 5 parts by weight based on 100 parts by weight of the monomer mixture.

An emulsifier and an antifoaming agent are added to the monomer mixture as described above to prepare a polymerization composition, and emulsion polymerization is performed in the presence of a polymerization initiator to prepare emulsified polymer particles, that is, latex particles, and each monomer may exist in the form of a repeating unit derived from each monomer in the latex particle.

In the present disclosure, the monomer mixture for performing the emulsion polymerization process contains an alkyl (meth)acrylate-based monomer; and a monomer having a hydroxyl group or a carboxyl group, and the monomer having a hydroxyl group or a carboxyl group is contained in an amount of 1 to 5 parts by weight based on 100 parts by weight of the total monomer mixture.

In the present disclosure, the term "monomer mixture" refers to a state in which one or more monomers described below are mixed together with acrylate-based monomers, and the one or more monomers may be added together or sequentially. Thus, the preparation method thereof is not limited.

The alkyl (meth)acrylate-based monomer is an alkyl (meth)acrylate-based monomer having an alkyl group, for example, a C1 to C14 alkyl group, and any material known in the art may be used without limitation. For example, the alkyl (meth)acrylate-based monomer may be at least one selected from the group consisting of methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, n-amyl (meth)acrylate, isoamyl (meth)acrylate, n-hexyl (meth)acrylate, n-heptyl (meth)acrylate, n-octyl (meth)acrylate, t-octyl (meth)acrylate, n-ethylhexyl (meth)acrylate, 2-ethylhexyl (meth)acrylate, decyl (meth)acrylate, isodecyl (meth)acrylate, tridecyl (meth)acrylate, stearyl (meth)acrylate, isostearyl (meth)acrylate, phenyl (meth)acrylate, benzyl (meth)acrylate, dodecyl (meth)acrylate, cyclohexyl (meth)acrylate, lauryl (meth)acrylate, seryl (meth)acrylate, glycidyl (meth)acrylate, and stearyl (meth)acrylate, and these may be used alone or in combination of two or more thereof.

According to an embodiment of the present disclosure, one or two or more selected from methyl (meth)acrylate, ethyl (meth)acrylate, butyl (meth)acrylate and 2-ethylhexyl (meth)acrylate may preferably be used.

For example, the alkyl (meth)acrylate-based monomer may be contained in an amount of 80 parts by weight or more, 85 parts by weight or more, 90 parts by weight or more, or 95 parts by weight or more, and 99.9 parts by weight or less, 99 parts by weight or less, or 98 parts by weight or less based on 100 parts by weight of the monomer mixture.

The monomer having a hydroxyl group or a carboxyl group is used to enhance peel strength and adhesion holding power by including the hydroxyl group or the carboxyl group, which is a hydrophilic group.

The monomer having a hydroxyl group or a carboxyl group may be an alkyl (meth)acrylate-based monomer having a hydroxyl group, a (meth)acrylic acid-based monomer, or a mixture thereof.

The alkyl (meth)acrylate-based monomer having a hydroxyl group may be at least one selected from the group consisting of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethyleneglycol (meth)acrylate, and 2-hydroxypropyleneglycol (meth)acrylate, and these may be used alone or in combination of two or more thereof.

The monomer having a carboxyl group may be at least one selected from the group consisting of (meth)acrylic acid, itaconic acid, and maleic anhydride, and these may be used alone or in combination of two or more thereof.

According to an embodiment of the present disclosure, one or two or more selected from 2-hydroxyethyl (meth) acrylate, and (meth)acrylic acid may preferably be used.

The monomer having a hydroxyl group or a carboxyl group is contained in an amount of 0.5 parts by weight or more, 1.0 parts by weight or more, or 2 parts by weight or more, and 5 parts by weight or less, 4.5 parts by weight or less, or 4 parts by weight or less based on 100 parts by weight of the monomer mixture. When too much of the monomer having a hydroxyl group or a carboxyl group is used, peeling strength may be reduced, and when too little is used, adhesion holding power may be insufficient.

In addition to the above monomer, the monomer mixture of the present disclosure may further contain another monomer generally used in an acrylate-based pressure-sensitive adhesive composition within the range that does not reduce adhesive properties and the desired effect of the invention.

For example, the monomer mixture may further contain a vinyl-based monomer.

The vinyl-based monomer may include at least one selected from the group consisting of a vinyl ester-based monomer having a C1 to C5 alkyl group; and an aromatic vinyl-based monomer.

The vinyl ester-based monomer may be an ester-based monomer having a vinyl group at one end of the molecule and a C1 to C5 alkyl group at the opposite end. Specifically, at least one selected from the group consisting of vinyl acetate, vinyl propanoate, vinyl butanoate, and vinyl pentanoate may be used.

In addition, the aromatic vinyl-based monomer may be at least one selected from the group consisting of styrene, methylstyrene, butylstyrene, chlorostyrene, vinylbenzoic acid, methyl vinylbenzoate, vinylnaphthalene, chloromethylstyrene, hydroxymethylstyrene, and divinylbenzene.

As the vinyl-based monomer, the above-described examples may be used alone or in combination of two or more thereof.

Meanwhile, according to an embodiment of the present disclosure, the monomer mixture may contain an additive without particular limitation within the range that does not reduce the desired effect of the invention in addition to the above-described components. For example, the additive may include an internal cross-linking agent, an external cross-linking agent, a buffer, a wetting agent, a neutralizing agent, a polymerization terminator, a tackifier, and the like, and may include one or two or more thereof.

The internal cross-linking agent may be at least one selected from the group consisting of allyl methacrylate, polyethylene glycol diacrylate, polycarbodiimide, allyl-N-methyl carbamate, 1,6-hexanediol diacrylate, hexanediolethoxylate diacrylate, hexanediolpropoxylate diacrylate, pentaerythritolethoxylate triacrylate, pentaerythritolpropoxylate triacrylate, vinyltrimethoxysilane, and divinylbenzene. Herein, the internal cross-linking agent may be used in an amount of about 0.2 parts by weight or less or about 0 to 0.2 parts by weight, or about 0.15 parts by weight or less or about 0.01 parts by weight to about 0.15 parts by weight, based on the monomer mixture.

As the external cross-linking agent, diacetone acrylamide (DAAM) and adipic acid dihydride (ADH) may be used to design the cross-linking reaction to additionally occur externally. The external cross-linking agent is added later at the end of the polymerization and functions as an intercross linker for connecting polymers. The external cross-linking agent may be used in an amount of about 1.2 parts by weight or less or about 0 to about 1.2 parts by weight, or about 0.7 parts by weight or less or about 0.01 parts by weight to about 0.7 parts by weight, based on the monomer mixture. The buffer may be sodium bicarbonate, sodium carbonate, sodium phosphate, sodium sulfate, sodium chloride, or the like, but the present disclosure is not limited thereto. In addition, these may be used alone or in combination of two or more thereof.

The buffer may adjust the pH in the polymerization reaction and impart stability to polymerization. The buffer may be used in an amount of about 1.0 parts by weight or less, or about 0 to about 1.0 parts by weight, or about 0.5 parts by weight or less, or about 0.1 parts by weight to about 0.5 parts by weight, based on 100 parts by weight of the monomer mixture.

The wetting agent functions as an emulsifier that lowers surface tension for coating property, and may be used within a content range well known in the art. For example, the wetting agent may be a dioctyl sodium sulfosuccinate (DOSS)-based compound. The wetting agent may be used in an amount of about 1.0 parts by weight or less or about 0 to about 2 parts by weight, or about 1.5 parts by weight or less or about 0.1 parts by weight to about 1.5 parts by weight, based on 100 parts by weight of the monomer mixture.

Examples of the neutralizing agent may include NaOH, $NH_4OH$, and KOH. The neutralizing agent may be used in an amount of about 1.0 parts by weight or less or about 0 to about 1.0 parts by weight, or about 0.5 parts by weight or less or about 0.1 parts by weight to about 0.5 parts by weight, based on the monomer mixture. In addition, the polymerization terminator is added to suppress a side reaction of radicals and residual monomers remaining after the production of latex, that is, acrylate-based emulsion resin, and is an additive that removes the radical to eliminate the additional reaction. The polymerization terminator may also be referred to as a radical inhibitor. It is also referred to simply as an inhibitor. The polymerization terminator is used in order to stop the polymerization reaction by rapidly reacting with radicals, a polymerization initiator or a monomer, to lose characteristics of radical, or in order to preserve a monomer because the radical polymerizable monomer is naturally polymerized when left in a pure state. It is also called as a polymerization inhibitor. However, even if the inhibitor is added, when a certain amount of time passes, it is consumed in between, so that the polymerization is naturally initiated. Representative inhibitors are hydroquinone and p-tert-butylcatechol. Benzoquinone, chloranil, m-dinitrobenzene, nitrobenzene p-phenyldiamine sulfur, and the like are easily reacted with radicals and stabilized. Diphenylpicrylhydrazyl-P-fulolphenylamine and tri-P-nitrophenylmethyl which are stable radicals are also used as inhibitors. Preferably, $NaNO_2$ may be used as the polymerization terminator. The polymerization terminator may be used in an amount of about 1.0 parts by weight or less or about 0 to about 1.0 parts by weight, or about 0.5 parts by weight or less or about 0.1 parts by weight to about 0.5 parts by weight, based on the monomer mixture.

Meanwhile, the monomer mixture may further include a molecular weight regulator, which functions as a chain transfer agent (CTA) during the polymerization reaction of the acrylate-based emulsion resin, and is attached to the end of the molecule to move radicals to another place.

According to an embodiment of the present disclosure, the polymerization composition may further contain an aqueous solvent such as water in addition to the above-described components.

Herein, the aqueous solvent may be used in an amount of about 10 to about 1,000 parts by weight based on 100 parts by weight of the monomer mixture, in terms of stability and viscosity control of latex particles. For example, the aqueous solvent may be used such that a total solid content (TSC) is adjusted to about 10 to about 60 wt % based on a total amount of the composition.

Emulsified polymer particles, that is, latex particles included in the acrylate-based pressure-sensitive adhesive composition according to an embodiment of the present disclosure are characterized in that they are prepared by an emulsion polymerization method especially using a polymerization initiator in a predetermined amount. In addition, there is another feature in adding an antifoaming agent to the emulsion-polymerized acrylate-based pressure-sensitive adhesive composition at a predetermined temperature.

Specifically, the preparation method of an acrylate-based pressure-sensitive adhesive composition includes the steps of preparing a monomer mixture containing an alkyl (meth) acrylate-based monomer; and a monomer having a hydroxyl group or a carboxyl group; preparing a polymerization composition by adding an emulsifier to the monomer mixture; performing emulsion polymerization of the polymerization composition in the presence of an initiator; and adding an antifoaming agent to the emulsion-polymerized acrylate-based pressure-sensitive adhesive composition, wherein the monomer having a hydroxyl group or a carboxyl group is contained in an amount of 1 to 5 parts by weight based on 100 parts by weight of the monomer mixture, the polymerization initiator is contained in an amount of 0.1 to 2 parts by weight based on 100 parts by weight of the monomer mixture, and the antifoaming agent is added at a temperature of 30 to 50° C.

First, the emulsifier is used to generate initial particles during polymerization of the monomer mixture, control the size of the generated particles, and impart stability to the particles. The emulsifier may include at least one emulsifier of a nonionic emulsifier and an anionic emulsifier.

The emulsifier is a material having a hydrophilic group and a hydrophobic group at the same time, and forms a micelle structure in the emulsion polymerization process, and allows polymerization of each monomer in the micelle structure.

The emulsifier generally used in the emulsion polymerization can be classified into an anionic emulsifier, a cationic emulsifier, and a nonionic emulsifier, and two or more types thereof are mixed and used in terms of polymerization stability in the emulsion polymerization.

Specifically, the anionic emulsifier may include at least one selected from the group consisting of sodium alkyldiphenyloxide disulfonate-based compounds, sodium polyoxyethylene alkyl ether sulfate-based compounds, and sodium dialkyl sulfosuccinate-based compounds.

In addition, the nonionic emulsifier may be at least one selected from the group consisting of a dialkylene glycol alkyl ether-based compound having a C2 to C5 alkylene group and a C5 to C15 alkyl group; a dialkylene glycol alkyl ester-based compound having a C2 to C5 alkylene group and a C5 to C15 alkyl group; and a dialkylene glycol alkyl amine-based compound having a C2 to C5 alkylene group and a C5 to C15 alkyl group, and these may be used alone or in combination of two or more thereof. Although using a mixture of an anionic emulsifier and a nonionic emulsifier may be more effective, the present disclosure is not necessarily limited to the types of these emulsifiers.

In addition, the emulsifier may be used in an amount of about 0.01 to about 2 parts by weight, or about 0.01 to about 1.0 parts by weight based on 100 parts by weight of the monomer mixture.

When too little emulsifier is used, the size of latex particles to be prepared may increase, and polymerization stability may decrease. When too much is used, the size of latex particles to be prepared may become too small, and viscosity of the emulsion pressure-sensitive adhesive may rise rapidly.

Examples of the polymerization initiator may include a water-soluble polymerization initiator such as ammonium or alkali metal persulfate, for example, ammonium persulfate, hydrogen peroxide, peroxide, hydroperoxide, and the like.

Herein, the polymerization initiator is used in an amount of 0.1 parts by weight or more, 0.15 parts by weight or more, or 0.2 parts by weight or more and 2 parts by weight or less, 1.5 parts by weight or less, 1.0 parts by weight or less, 0.8 parts by weight or less, 0.7 parts by weight or less, 0.5 parts by weight or less, 0.45 parts by weight or less, or 0.3 parts by weight or less based on 100 parts by weight of the monomer mixture. When too little of the polymerization initiator is added, such as less than 0.1 parts by weight, peeling strength may be reduced, and when too much is added in excess of 2 parts by weight, the molecular weight may become too small and holding power may be weakened. Therefore, the amount of the polymerization initiator added may preferably be within the above-described range.

In the polymerization of the monomer mixture, the polymerization initiator may be used by being appropriately divided one or more times within the above-mentioned range. Preferably, the polymerization initiator may be added simultaneously with the pre-emulsion, which is the polymerization composition, dividedly or continuously over a time up to about 70% of the total polymerization time.

In addition, an activator may be further contained to accelerate the initiation of the reaction of the peroxide together with the polymerization initiator, and at least one selected from the group consisting of sodium formaldehyde sulfoxylate, sodium ethylenediamine tetraacetate, ferrous sulfate, and dextrose may be used.

During the emulsion polymerization, the polymerization temperature and polymerization time may be appropriately determined depending on the case. For example, the emulsion polymerization may be performed for about 2 hours to about 8 hours at a temperature of about 70 to 90° C. In consideration of physical properties of the pressure-sensitive adhesive, the polymerization temperature may be about 75 to about 85° C.

In order to prepare a film-type pressure-sensitive adhesive using the acrylate-based pressure-sensitive adhesive composition, a process of coating the pressure-sensitive adhesive composition on a substrate is required, and a bar-coating method, a knife-coating method, a roll-coating method, a blade-coating method, a die-coating method, or a gravure-coating method may be used. The gravure coater is a coating method capable of both high-speed and low-speed processes. When the acrylate-based pressure-sensitive adhesive composition is coated by a high-speed gravure coating method, bubbles are easily generated due to the high speed of roll, and when bubbles are generated, foreign matter may be formed on the surface of the coating layer or fish eyes may occur.

There is a method of adding an excessive amount of an antifoaming agent to suppress the generation of bubbles, but this may also cause a decrease in adhesive properties and may impair coating properties.

According to the preparation method of the present disclosure, the antifoaming agent is added within a certain temperature range, and it is possible to exhibit excellent antifoaming ability with only a small amount of the antifoaming agent. In addition, it was confirmed from the present disclosure that the change in antifoaming ability over time is small, and thus an effect of the antifoaming agent can be maintained for a long time.

More specifically, in the preparation method of the present disclosure, the antifoaming agent is added when the temperature of the acrylate-based pressure-sensitive adhesive composition is 30° C. or more, or 35° C. or more, and 50° C. or less, or 45° C. or less after the emulsion polymerization. If the antifoaming agent is added when the temperature of the acrylate-based pressure-sensitive adhesive composition is less than 30° C., antifoaming ability may be lowered, and when it exceeds 50° C., the antifoaming agent is not well dispersed, which may cause fish eyes during coating.

As the antifoaming agent, a general antifoaming agent used in the acrylate-based pressure-sensitive adhesive composition may be used. For example, the antifoaming agent may be at least one selected from the group consisting of mineral oil, silicone oil, and silica particles, and these may be used alone or in combination of two or more thereof.

Herein, the antifoaming agent may be contained in an amount of 0.1 parts by weight or more, 0.2 parts by weight or more, or 0.3 parts by weight or more and 1.0 parts by weight or less, 0.9 parts by weight or less, or 0.8 parts by weight or less based on 100 parts by weight of the monomer mixture. The amount of the antifoaming agent used is significantly lower than that of the conventional antifoaming agent, and in the present disclosure, a sufficient antifoaming effect can be achieved even with a small amount of the antifoaming agent by setting the optimum addition temperature of the antifoaming agent.

The preparation method may further include a step of mixing for a predetermined period of time after adding the antifoaming agent to the acrylate-based pressure-sensitive adhesive composition, and the mixing may be performed after the addition or simultaneously with the addition.

Herein, the mixing of the acrylate-based pressure-sensitive adhesive composition and the antifoaming agent may be performed at 450 rpm or more, 500 rpm or more, or 550 rpm or more, and 700 rpm or less, 650 rpm or less, or 600 rpm or less when stirred and mixed using a 4 cm diameter stirrer. In addition, the mixing of the acrylate-based pressure-sensitive adhesive composition and the antifoaming agent may be performed for 20 minutes or more, 25 minutes or more, or 30 minutes or more, and 180 minutes or less, 120 minutes or less, 100 minutes or less, or 90 minutes or less. When mixing the acrylate-based pressure-sensitive adhesive composition and the antifoaming agent with such a mixing speed and time, the optimum antifoaming ability can be achieved even with a small amount of the antifoaming agent. The above mixing conditions can be changed and applied according to conditions such as reactor capacity considering the outermost linear velocity of the stirrer.

The acrylate-based pressure-sensitive adhesive composition prepared according to the preparation method of the present disclosure may be applied to an adhesive label, but is not limited thereto.

In addition, the acrylate-based pressure-sensitive adhesive composition may have a peel strength (180° peel) of 15 N/inch or more, 17 N/inch or more, or 19 N/inch or more, and 24 N/inch or less, 23 N/inch or less, or 22 N/inch or less. Herein, the peel strength may be measured in accordance with FINAT TEST METHOD NO. 1.

In addition, the acrylate-based pressure-sensitive adhesive composition may have ball tack of #10 to #25, or #10 to #15. Herein, the ball tack is measured in accordance with the SUS rolling method at an inclined surface, and a more detailed measurement method will be described in detail in Experimental Example to be described later.

In addition, the acrylate-based pressure-sensitive adhesive composition may have antifoaming ability of 15 mm or less, 14 mm or less, 13 mm or less, or 12 mm or less when measured by an air bubble measurement method. As the lower antifoaming ability is evaluated as the better, there is no specific lower limit. However, the antifoaming ability may be, for example, 4 mm or more, 5 mm or more, 6 mm or more, or 7 mm or more.

In addition, the acrylate-based pressure-sensitive adhesive composition has little change in antifoaming ability over time, so that it has little deterioration in antifoaming ability even after storage for a long time. For example, the acrylate-based pressure-sensitive adhesive composition may have antifoaming ability of 15 mm or less, 14 mm or less, 13 mm or less, or 12 mm or less, when measured by an air bubble measurement method even after storage at room temperature for 7 days. As the lower antifoaming ability is evaluated as the better, there is no specific lower limit. However, the antifoaming ability may be, for example, 4 mm or more, 5 mm or more, 6 mm or more, or 7 mm or more.

The method of measuring the antifoaming ability by the air bubble method will be described in detail in Experimental Example to be described later.

In addition, when the acrylate-based pressure-sensitive adhesive composition is coated with a bar coater on a release paper such that a coating thickness after drying is 22±2 μm (drying is performed at 120° C. for 1 minute), the dried acrylate-based adhesive composition may have 0 to 5 fish eyes, 0 to 3 fish eyes, or 0 to 2 fish eyes generated within a coating area of 20 cm*30 cm, indicating excellent coating properties. Hereinafter, the function and effect of the present invention will be described in more detail through specific examples of the present invention. However, these examples are for illustrative purposes only, and the invention is not intended to be limited by these examples.

EXAMPLES

Example 1

The acrylate-based pressure-sensitive adhesive composition was prepared as follows.

First, 230 g of ion-exchanged water was added to a glass reactor equipped with a thermometer, a stirrer, a dropping funnel, a nitrogen inlet tube and a reflux condenser, and 1 g of sodium polyoxyethylene alkyl ether sulfate at a concentration of 26 wt % was added. After the inside of the reactor was replaced with nitrogen while stirring, the temperature was raised to about 85° C. under a nitrogen atmosphere. Nitrogen was purged for 60 minutes to remove oxygen.

In a separate 2 L beaker, 609 g of 2-ethylhexyl acrylate (2-EHA), 70 g of methyl methacrylate (MMA), 14 g of hydroxyethyl acrylate (HEA), and 7 g of acrylic acid (AA) were mixed to prepare a monomer mixture.

In addition, a solution containing 2.8 g of a sodium alkyldiphenyl oxide disulfonate solution at a concentration of 50 wt %, 21.5 g of sodium polyoxyethylene alkyl ether sulfate at a concentration of 26 wt %, 1.5 g of sodium hydroxide, and 190 g of water was added to the monomer mixture, and mixed with a stirrer to prepare a milky emulsion.

The milky emulsion and 105 g of an ammonium persulfate solution at a concentration of 2 wt % were continuously and evenly added to the glass reactor for 6 hours. After the addition of the ammonium persulfate solution and the emulsion was completed, the temperature was raised to 80° C. and maintained for 2 hours to perform an emulsion polymerization reaction.

When the aging for 2 hours was completed, 28 g of sodium hydroxide at a concentration of 5 wt % was added and maintained at 80° C. for 1 hour, and then cooled down to 40° C.

200 g of the cooled acrylate-based pressure-sensitive adhesive composition was taken, 0.72 g of DF642NI (Solvay Corporation) was added as an antifoaming agent, and mixed at 600 rpm for 30 minutes. The stirrer for mixing was an anchor type with a diameter of 4 cm.

Examples 2 to 9 and Comparative Examples 1 to 6

Examples 2 to 9 and Comparative Examples 1 to 6 were performed by changing the composition of the monomer, the content of the initiator, and the method of adding the antifoaming agent from Example 1, and main conditions of each Example and Comparative Example are shown in Table 1 below.

TABLE 1

| | Monomer composition (phr) | | | | Polymerization initiator (phr) | Antifoaming agent | | | |
|---|---|---|---|---|---|---|---|---|---|
| | AA | HEA | 2-EHA | MMA | | Content (phr) | Mixing time (min) | Mixing speed (rpm) | Adding temp. (° C.) |
| Ex. 1 | 1 | 2 | 87 | 10 | 0.3 | 0.6 | 30 | 600 | 40 |
| Ex. 2 | 0.5 | 2 | 87.5 | 10 | 0.1 | 0.4 | 30 | 600 | 40 |
| Ex. 3 | 1 | 0 | 89 | 10 | 0.2 | 0.6 | 60 | 600 | 40 |
| Ex. 4 | 0.5 | 2 | 87.5 | 10 | 0.5 | 0.5 | 60 | 600 | 40 |
| Ex. 5 | 0 | 3 | 87 | 10 | 0.2 | 0.6 | 30 | 600 | 40 |
| Ex. 6 | 0.5 | 1 | 83.5 | 15 | 0.3 | 0.6 | 30 | 600 | 40 |
| Ex. 7 | 1 | 2 | 87 | 10 | 0.3 | 0.6 | 30 | 600 | 30 |
| Ex. 8 | 1 | 2 | 87 | 10 | 0.3 | 0.6 | 30 | 600 | 50 |
| Ex. 9 | 1 | 2 | 87 | 10 | 0.7 | 0.6 | 30 | 600 | 40 |
| Comp. Ex. 1 | 1 | 2 | 87 | 10 | 0.3 | 0.6 | 30 | 600 | 25 |
| Comp. Ex. 2 | 0.5 | 2 | 87.5 | 10 | 0.1 | 0.4 | 30 | 300 | 25 |
| Comp. Ex. 3 | 1 | 0 | 89 | 10 | 0.2 | 0.6 | 240 | 700 | 25 |
| Comp. Ex. 4 | 0.5 | 1 | 88.5 | 10 | 0.3 | 0.0 | | | |
| Comp. Ex. 5 | 0.2 | 1 | 88.8 | 10 | 0.2 | 1.0 | 30 | 600 | 25 |
| Comp. Ex. 6 | 1 | 2 | 87 | 10 | 0.3 | 0.6 | 30 | 600 | 70 |

(In Table 1, the content of each component is in parts by weight based on 100 parts by weight of the total monomer mixture.)

AA: Acrylic acid
HEA: Hydroxyethyl acrylate
BA: Butyl acrylate
2-EHA: 2-ethylhexylacrylate
MMA: Methyl methacrylate Experimental Examples Preparation of Adhesive-Coated Adhesive Specimen Each of the pressure-sensitive adhesive compositions prepared in Examples and Comparative Examples was coated on a silicone-coated release paper, and dried in an oven at about 120° C. for about 1 minute so that a pressure-sensitive adhesive layer had a thickness of about 20 μM. This was laminated with semi-gloss paper to make an adhesive sheet and cut into a size of 1 inch×150 mm to prepare a paper label specimen.

Adhesive properties of the paper label specimens using the acrylate-based pressure-sensitive adhesive compositions prepared in the above Examples and Comparative Examples were tested in the following manner. The results are shown in Table 2 below.

1) Ball Tack

Figure 1:
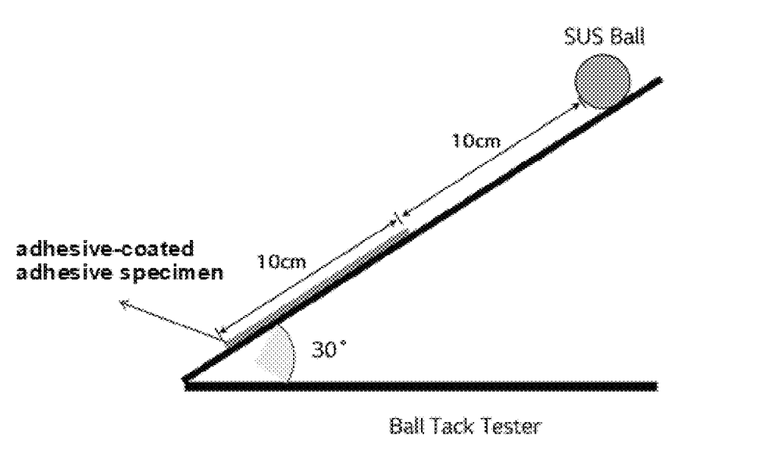

The label specimen was cut into a size of 10 cm*10 cm, and attached to a lower part of a 30° inclined surface such that a coated surface coated with the acrylate-based adhesive was exposed upward as shown in the FIGURE. Subsequently, SUS balls were rolled down from a largest diameter ball (1 inch, #32) to a smallest diameter ball at diameter intervals of 1/32 inches from a point 10 cm above the top of the adhesive. Rolling down the balls was continued until any one ball stopped in the section to which the label specimen was attached.

The ball tack value was taken as the number (#) of the SUS ball having the longest diameter.

2) Peel Strength (N/Inch)

The peel strength of the acrylate-based pressure-sensitive adhesive label specimen was measured in accordance with FINAT TEST METHOD NO. 1. Specifically, each adhesive label specimen was attached to a stainless steel plate by reciprocating a 2 kg roller once at about 300 mm/min and aged at room temperature for about 20 minutes. Thereafter, the aged adhesive label specimen was subjected to 180° peeling at about 300 mm/min to measure the peel strength using a TA Texture Analyzer.

3) Holding Power (Shear, Unit: Hr)

The holding power of the pressure-sensitive adhesive label specimen (1 inch×10 cm) was measured in accordance with FINAT TEST METHOD NO. 8. Specifically, the pressure-sensitive adhesive specimen (1 inch×10 cm) was attached to the surface of a stainless steel plate (SUS) such that a contact area was 1 inch×1 inch, and then compressed by reciprocating a 2 kg roller twice at about 300 mm/min. After 20 minutes, the stainless steel plate to which the adhesive specimen is attached was fixed to a wall inclined by about 2° (the angle between the surface of the stainless steel plate to which the adhesive specimen is attached and the ground is about 88°), and a weight of 1000 g was applied to the bottom of the adhesive specimen. Thereafter, the time taken for the pressure-sensitive adhesive specimen to detach from the stainless steel plate at a temperature of 23° C. and a humidity of 50% was measured.

4) Antifoaming Ability

The antifoaming ability was measured by an air bubble measurement method. Specifically, 10 g of the acrylate-based pressure-sensitive adhesive composition was weighed and added into a 3 cm-diameter graduated cylinder. A Teflon tube with an inner diameter of 1 mm was immersed in the emulsion resin, and a height of bubbles rising for 5 min when injecting air at 25 cc/min was measured.

5) Change in Antifoaming Ability Over Time after 7 Days

The antifoaming ability was measured in the same manner as in 4) using the acrylate-based pressure-sensitive adhesive composition stored at room temperature for 7 days to test the change in antifoaming ability over time.

6) Coating Property

When the acrylate-based adhesive composition was coated with a bar coater on a release paper such that a coating thickness after drying is 22±2 μm (drying is performed at 120° C. for 1 minute), the number of fish eyes generated within a coating area of 20 cm*30 cm was measured.

TABLE 2

| | Ball Tack (#) | 180° Peel (N/in) | Shear (h) | Antifoaming ability (mm) | Change in antifoaming ability after 7 days (mm) | Coating property (Fish Eye) |
|---|---|---|---|---|---|---|
| Ex. 1 | 14 | 19.3 | 111 | 9 | 11 | 0 |
| Ex. 2 | 15 | 21.6 | 75 | 11 | 14 | 0 |
| Ex. 3 | 12 | 21.3 | 51 | 9 | 11 | 0 |
| Ex. 4 | 14 | 22.2 | 69 | 10 | 13 | 0 |
| Ex. 5 | 13 | 21.9 | 37 | 9 | 12 | 0 |
| Ex. 6 | 10 | 17.0 | 51 | 9 | 10 | 1 |
| Ex. 7 | 14 | 19.1 | 131 | 11 | 13 | 0 |
| Ex. 8 | 14 | 18.9 | 124 | 8 | 11 | 1 |
| Ex. 9 | 14 | 23.2 | 34 | 9 | 11 | 0 |
| Comp. Ex. 1 | 14 | 19.3 | 111 | 9 | 11 | 8 |
| Comp. Ex. 2 | 15 | 19.1 | 76 | 16 | 22 | 0 |
| Comp. Ex. 3 | 12 | 20.3 | 31 | 18 | 38 | 0 |
| Comp. Ex. 4 | 13 | 18.3 | 35 | 50 | 79 | 0 |
| Comp. Ex. 5 | 12 | 19.2 | 60 | 8 | 12 | 5 |
| Comp. Ex. 6 | 15 | 19.1 | 131 | 8 | 10 | 6 |

Referring to Table 2, the acrylate-based pressure-sensitive adhesive compositions prepared according to the preparation method of the present disclosure were excellent in all of ball tack, peel strength, holding power, and antifoaming ability. In addition, the change in antifoaming ability over time measured after 7 days was significantly less than that of Comparative Examples, and they had excellent coating properties. Accordingly, they are suitable for a high-speed coating process and expected to exhibit stable coating properties over time.

What is claimed is:

1. A preparation method of an acrylate-based pressure-sensitive adhesive composition, comprising:
   preparing a monomer mixture containing an alkyl (meth) acrylate-based monomer; and a monomer having a hydroxyl group or a carboxyl group;
   preparing a polymerization composition by adding an emulsifier to the monomer mixture;
   performing emulsion polymerization of the polymerization composition in the presence of a polymerization initiator to form an emulsion-polymerized acrylate-based pressure-sensitive adhesive composition; and
   adding an antifoaming agent to the emulsion-polymerized acrylate-based pressure-sensitive adhesive composition to form the acrylate-based pressure-sensitive adhesive composition,
   wherein the monomer having a hydroxyl group or a carboxyl group is contained in an amount of 1 to 5 parts by weight based on 100 parts by weight of the monomer mixture,
   the polymerization initiator is contained in an amount of 0.1 to 2 parts by weight based on 100 parts by weight of the monomer mixture, and
   the antifoaming agent is added at a temperature of 30 to 50° C.,
   wherein the antifoaming agent is contained in an amount of 0.1 to 1.0 parts by weight based on 100 parts by weight of the monomer mixture.

2. The preparation method of an acrylate-based pressure-sensitive adhesive composition of claim 1,
   wherein the monomer having a hydroxyl group or a carboxyl group comprises an alkyl (meth)acrylate-based monomer having a hydroxyl group, a (meth) acrylic acid-based monomer, or a mixture thereof.

3. The preparation method of an acrylate-based pressure-sensitive adhesive composition of claim 2,
   wherein the alkyl (meth)acrylate-based monomer having a hydroxyl group comprises at least one of 2-hydroxyethyl (meth)acrylate, 2-hydroxypropyl (meth)acrylate, 2-hydroxybutyl (meth)acrylate, 4-hydroxybutyl (meth) acrylate, 6-hydroxyhexyl (meth)acrylate, 2-hydroxyethyleneglycol (meth)acrylate, or 2-hydroxypropyleneglycol (meth)acrylate.

4. The preparation method of an acrylate-based pressure-sensitive adhesive composition of claim 1,
   wherein the alkyl (meth)acrylate-based monomer is an alkyl (meth)acrylate-based monomer having a C1 to C14 alkyl group, and the alkyl (meth)acrylate-based monomer having a C1 to C14 alkyl group comprises at least one of methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, n-amyl (meth)acrylate, isoamyl (meth) acrylate, n-hexyl (meth)acrylate, n-heptyl (meth)acrylate, n-octyl (meth)acrylate, t-octyl (meth)acrylate, n-ethylhexyl (meth)acrylate, 2-ethylhexyl (meth)acrylate, decyl (meth)acrylate, isodecyl (meth)acrylate, tridecyl (meth)acrylate, dodecyl (meth)acrylate, cyclohexyl (meth)acrylate, lauryl (meth)acrylate, or seryl (meth)acrylate.

5. The preparation method of an acrylate-based pressure-sensitive adhesive composition of claim 1,
   wherein the antifoaming agent comprises at least one of mineral oil, silicone oil, or silica particles.

6. The preparation method of an acrylate-based pressure-sensitive adhesive composition of claim 1,
   wherein the polymerization initiator comprises at least one of ammonium persulfate, hydrogen peroxide, or hydro peroxide.

7. The preparation method of an acrylate-based pressure-sensitive adhesive composition of claim 1,
   wherein the monomer mixture further contains at least one of an internal cross-linking agent, an external cross-linking agent, a buffer, a wetting agent, a neutralizing agent, a polymerization terminator, or a tackifier.

8. The preparation method of an acrylate-based pressure-sensitive adhesive composition of claim 1, wherein the emulsion polymerization is performed by stirring at a temperature of 70 to 90° C. for 2 to 8 hours.

9. The preparation method of an acrylate-based pressure-sensitive adhesive composition of claim 1, further comprising mixing for 20 to 180 minutes at 450 to 700 rpm after adding the antifoaming agent.

* * * * *